Patented Nov. 28, 1933

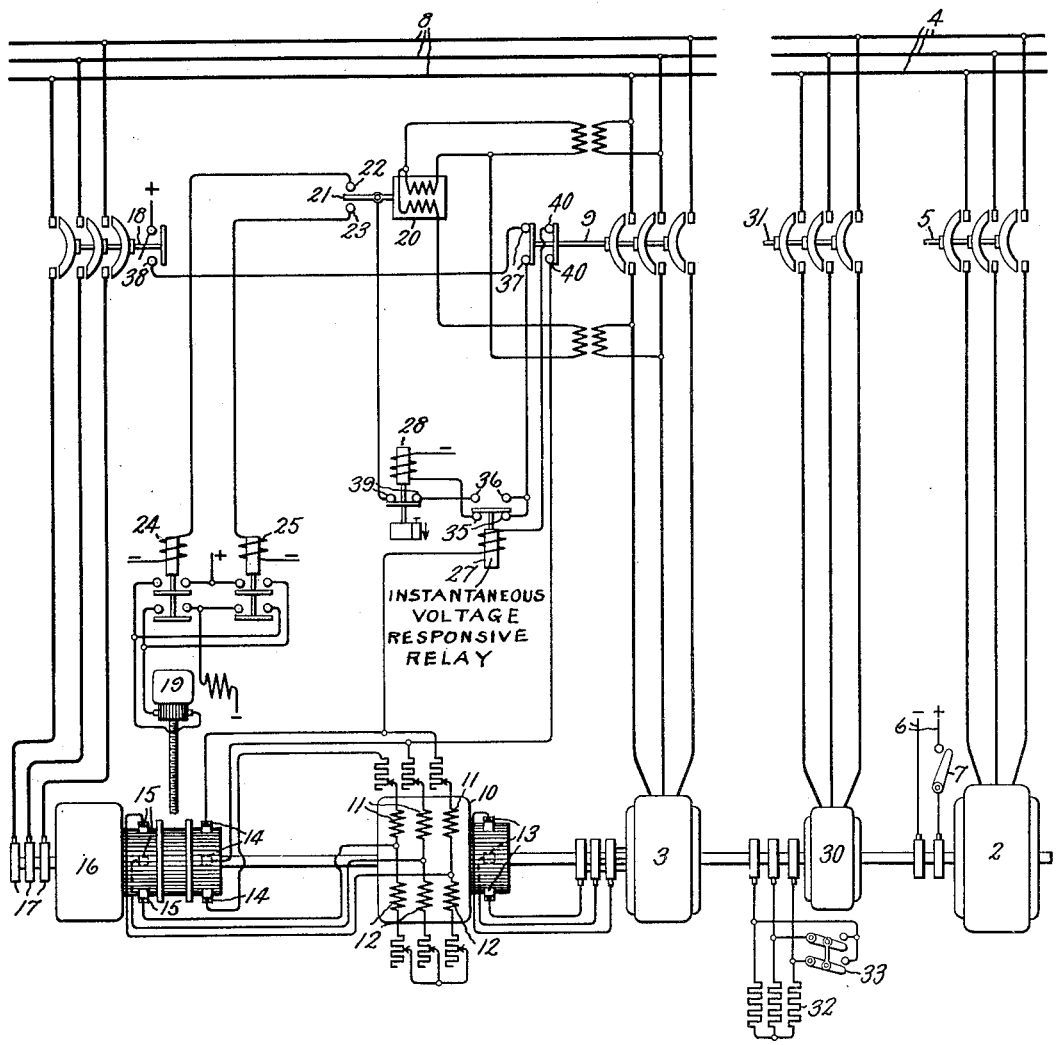

1,937,368

UNITED STATES PATENT OFFICE 1,937,368

CONTROL SYSTEM

George S. Whitlow, University City, Mo., and Harold T. Seeley, Yeadon, Pa., assignors to General Electric Company, a corporation of New York Application April 23, 1932. Serial No. 607,202

8 Claims. (Cl. 171—118)

Our invention relates to control systems and particularly to automatic control systems for asynchronous machines of the type which have a phase wound secondary winding supplied with a current of slip frequency from a separate source.

One object of our invention is to provide an improved arrangement for automatically controlling the voltage of slip frequency applied to the phase wound secondary winding of an asynchronous machine so as to produce a predetermined voltage condition in the primary winding of the machine. In accordance with our invention, we provide a suitable timing arrangement which is controlled by the instantaneous value of the voltage of slip frequency applied to the secondary winding of the machine so that the voltage is automatically adjusted during only a portion of each cycle of the voltage.

Our invention is particularly adapted for use in an arrangement for automatically synchronizing a frequency converter comprising a synchronous machine mechanically connected to an asynchronous machine which consists in first connecting one of the machines to one electric system and then regulating the voltage of slip frequency applied to the secondary winding of the asynchronous machine to bring the other machine into synchronism with the other electric system before they are connected together.

Our invention will be better understood from the following description when taken in connection with the accompanying drawing which diagrammatically illustrates a frequency converter control system embodying our invention and its scope will be pointed out in the appended claims.

In the drawing, 1 represents a frequency converter comprising a synchronous machine 2 and an asynchronous machine which 3 have their rotors mechanically connected together. The synchronous machine 2 has a primary winding which is arranged to be connected to an electric circuit 4 by a suitable switch 5. The synchronous machine 2 also has a field winding which is arranged to be connected to a suitable source of excitation 6 by a suitable switch 7. In order to simplify the disclosure, these switches 5 and 7 are shown as manually operated devices.

The asynchronous machine 3 has a primary winding which is arranged to be connected to another electric circuit 8 by means of a suitable switch 9. The asynchronous machine 3 also has a phase wound secondary winding which is connected to a suitable alternatng current exciter 10 which is arranged to produce a voltage of slip frequency. As shown in the drawing, the exciter 10 is a dynamo-electric machine which has its rotor mechanically connected to the rotors of the machines 2 and 3. This machine is provided with two sets of field windings 11 and 12 and is also provided with an armature winding which is connected by means of brushes 13 to the secondary winding of the asynchronous machine 3. The field windings 11 and 12 are connected in a manner well known in the art to two sets of adjustable brushes 14 and 15 of an ohmic drop exciter 16, the slip rings 17 of which are arranged to be connected to the electric circuit 8 by means of a suitable switch 18. The rotor of the ohmic drop exciter 16 is mechanically connected to the rotors of the machines 2, 3 and 10. The brushes 14 and 15 of the ohmic drop exciter 16 are adjusted in a desired manner by means of a reversible motor 19. Since the detail construction of the brush operating means constitutes no part of our invention and such construction is well known in the art and an example of such construction is disclosed in United States Letters Patent 1,778,599, we have omitted all constructional details of the brush operating mechanism. As shown in the drawing, the machines 10 and 16 constitute one modification of the well known Scherbius control system for applying an adjustable voltage of slip frequency to the secondary winding of a dynamo-electric machine.

By operating the brush shifting motor 19 in the proper direction while the switch 9 is open, the primary voltage of the machine 3 may be brought into phase with the voltage of the circuit 8. As is well known in the art, the brush operating mechanism is also constructed so that when the primary voltage of the machine 3 and the voltage of the circuit 8 are in phase, their magnitudes are also substantially equal. In order that the brushes 14 and 15 may be automatically adjusted so as to bring the primary voltage of the machine 3 into phase with the voltage of the circuit 8, we provide a relay 20 which is connected to one phase of the primary winding of the machine 3 and to one phase of the circuit 8 so that the relay responds to a predetermined phase relation between these voltages. Preferably, the relay 20 is designed to operate in accordance with the sine of the angle between the voltages of the two corresponding phases so that when the primary voltage of the machine 3 leads the voltage of circuit 8, the relay 20 closes its contacts 21 and 22 to effect the completion of a circuit for the motor 19 so that the brushes 14 and 15 are shifted in a direction to bring the voltages into phase and when the primary voltage of the machine 3 lags the voltage of circuit 8, the relay 20 closes its contacts 21 and 23 to effect the completion of another circuit for the motor 19 so that the brushes are shifted in the opposite direction to bring the voltages into phase. As shown in the drawing, the contacts 21 and 22 control the circuit of a control relay 24 which, in turn, controls the circuits of the motor 19 so as to cause it to operate in one direction and the contacts 21 and 23 of the relay 20 control the circuit of a control relay 25 which, in turn, controls the circuits of the motor 19 so as to cause it to operate in the opposite direction.

In order to prevent overrunning of the brush operating motor, we provide in accordance with our invention an arrangement for permitting the relay 20 to effect the operation of the brush operating motor 19 during only a portion of each cycle of the slip frequency voltage applied to the secondary winding of the machine 3. In the particular embodiment of our invention shown in the drawing, this result is obtained by connecting across two of the brushes 14 of the ohmic drop exciter 16 a voltage relay 27, which is designed in any suitable manner so that it responds to a predetermined instantaneous value of the voltage across the two brushes, and having this relay control contacts in series with the control relays 24 and 25. The voltage relay 27 also controls the operation of a suitable timing relay 28 so that it interrupts the circuit through the contacts of the relay 27 after they have been closed a predetermined time. Therefore, during each half cycle of the slip frequency voltage applied to the secondary winding of the machine 3 one of the control relays is energized for a predetermined time if the contact 21 of the relay 20 is in engagement with either of its cooperating contacts. Therefore, it will be seen that the rate at which the brushes are shifted varies directly with the slip frequency.

In the particular arrangement shown in the drawing, a starting motor 30 is provided for starting the frequency converter 1 from rest and bringing it up to substantially synchronous speed. It is obvious, however, that the frequency converter may be started in any other suitable manner, examples of which are well known in the art. As shown, a switch 31 is provided for connecting the primary winding of the starting motor 30 to the circuit 4 and a starting resistor 32 is provided in the secondary circuit of the starting motor. This starting resistor 32 is arranged to be short-circuited by a suitable switch 33.

In order to simplify the disclosure, the switches 9, 18, 31 and 33 are shown as manually controlled devices but it is obvious that they may be automatically controlled in any suitable manner examples of which are well known in the art.

The operation of the arrangement shown in the drawing is as follows: When it is desired to start the frequency converter 1, the switch 31 is closed to connect the primary winding of the starting motor 30 to the circuit 4. After the motor 30 has reached a predetermined speed, the switch 33 is closed to short-circuit the starting resistor 32 in the secondary circuit of the motor. The switch 7 is then closed to excite the machine 2 and the switch 5 is closed to connect the primary winding of the synchronous machine 2 to the circuit 4 after which the switches 31 and 33 are opened. The switch 18 is then closed to connect the slip rings 17 of the ohmic drop exciter 16 to the circuit 8. The exciter 16 then operates in a manner well known in the art to apply voltage of slip frequency to the windings 11 and 12 of the alternating current exciter 10 so that a voltage of slip frequency is also applied to the secondary winding of the asynchronous machine 3. The voltage induced in the primary winding of the machine 3 and the voltage of the circuit 8, therefore, are of the same frequency.

During each half cycle of the voltage of slip frequency applied to the winding of the relay 27, this relay operates to open its contacts 35 and close its contacts 36 when the instantaneous value increases above a predetermined value and operates to close its contacts 35 and open its contacts 36 when the instantaneous value of the voltage decreases below a predetermined value. Preferably the pick-up value of the relay 27 is approximately 60% of the maximum instantaneous value of the voltage and the drop-out value is approximately zero volts. The relay 27 by opening its contacts 35 interrupts the circuit of the time relay 28. This circuit of the relay 28 also includes auxiliary contacts 37 on the switch 9 and the auxiliary contacts 38 on the switch 18. The relay 28 is designed in any suitable manner so that when it is energized, the contacts 39 which are in series with the contacts 36 of relay 27 are instantly closed and when it is deenergized the contacts are opened after the relay has been deenergized a predetermined time. The time setting of the relay 28 is such that the time it takes the relay to open its contacts 39 is less than the minimum time the contacts 36 of relay 27 are maintained closed during the regulating operation. Therefore, it will be seen that twice during each cycle of the voltage of slip frequency applied to the secondary winding of the machine 3, the contacts 36 and 39 are connected in series for a predetermined time. Each time these contacts 36 and 39 are connected in series a circuit is completed for the brush shifting motor 19 if the desired phase relation does not exist between the primary voltage of the machine 3 and the voltage of the circuit 8. If the primary voltage of the machine 3 leads the voltage of the circuit 8, the contacts 21 and 22 of the phase responsive relay 20 are in engagement so that each time the contacts 36 and 39, are connected in series, a circuit is completed for the control relay 24. Each time the control relay 24 is energized it completes a circuit for the brush shifting motor 19 so that the brushes 14 and 15 are shifted in the proper direction to decrease the lead of the primary voltage of the machine 3. This circuit of the control relay 24 also includes the auxiliary contacts 37 on the switch 9 and the auxiliary contacts 38 on the switch 18.

If the primary voltage of the machine 3 lags the voltage of the circuit 8, the contacts 21 and 23 of the phase responsive relay 20 are in engagement so that each time the contacts 36 and 39 are connected in series a circuit is completed for the control relay 25. Each time this control relay is energized, it completes a circuit for the brush shifting motor 19 so that the brushes 14 and 15 are shifted in the opposite direction to decrease the lag of the primary voltage of the machine 3. The energizing circuit of the control relay 25 also includes the auxiliary contacts 37 on the switch 9 and the auxiliary contacts 38 on the switch 18.

When the desired phase relation between the primary voltage of the machine 3 and the voltage of the circuit 8 is obtained, the switch 9 is closed in any suitable manner to connect the primary winding of the asynchronous machine 3 to the circuit 8 and thereby interconnect the frequency converter 1 between the circuits 4 and 8. By opening its auxiliary contacts 37 the switch 9 removes the brush shifting motor 19 from the control of the phase responsive relay 20. By opening its auxiliary contacts 40, the switch 9 interrupts the circuit of the instantaneous voltage responsive relay 27. The frequency converter 1 now is in a condition to be operated to transfer energy from one of the circuits to the other.

While we have, in accordance with the Patent Statutes, shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:

1. In combination, an alternating current circuit, an alternating current dynamo-electric machine having its primary winding connected to said circuit and having a phase wound secondary winding, a source of slip frequency voltage, means including said source for applying a voltage of slip frequency to said secondary winding, means for varying the magnitude of the voltage applied to said secondary winding, and control means for said voltage varying means operative during only a portion of each cycle of said voltage.

2. In combination, an alternating current circuit, an alternating current dynamo-electric machine having its primary winding connected to said circuit and having a phase wound secondary winding, a source of slip frequency voltage, means including said source for applying a voltage of slip frequency to said secondary winding, means for varying the magnitude of the voltage applied to said secondary winding, and control means for said voltage varying means operative for a predetermined time during only a portion of each cycle of said voltage.

3. In combination, two alternating current circuits, two dynamo-electric machines having their rotors mechanically connected together, means for connecting the primary winding of one of said machines to one of said circuits, means for applying a voltage of slip frequency to the secondary winding of the other machine including an ohmic drop exciter having its rotor mechanically connected to the rotors of said machines, said exciter including a plurality of adjustable brushes, and means responsive to the instantaneous value of said voltage for effecting the adjustment of said brushes during a portion of each cycle of said voltage.

4. In combination, two alternating current circuits, two dynamo-electric machines having their rotors mechanically connected together, means for connecting the primary winding of one of said machines to one of said circuits, means for applying a voltage of slip frequency to the secondary winding of the other machine including an ohmic drop exciter having its rotor mechanically connected to the rotors of said machines, said exciter including a plurality of adjustable brushes, and means responsive to the instantaneous value of said voltage for effecting the adjustment of said brushes during a portion of each half cycle of said voltage.

5. In combination, two alternating current circuits, two dynamo-electric machines having their rotors mechanically connected together, means for connecting the primary winding of one of said machines to one of said circuits, means for applying a voltage of slip frequency to the secondary winding of the other machine including an ohmic drop exciter having its rotor mechanically connected to the rotors of said machines, said exciter including a plurality of adjustable brushes, means responsive to the voltage of slip frequency, and timing means controlled by said voltage responsive means for effecting for a predetermined time during each cycle of said voltage an adjustment of said brushes.

6. In combination, two alternating current circuits, two dynamo-electric machines having their rotors mechanically connected together, means for connecting the primary winding of one of said machines to one of said circuits, means for applying a voltage of slip frequency to the secondary winding of the other machine including an ohmic drop exciter having its rotor mechanically connected to the rotors of said machines, said exciter including a plurality of adjustable brushes, means responsive to a predetermined relation between the voltages of the primary winding of said other machine and the other circuit for controlling the adjustment of said brushes, and anti-hunting means for said brush controlling means including means responsive to the instantaneous value of said voltage, and timing means controlled by said voltage responsive means for rendering said brush controlling means operative to control the brushes for only a predetermined time during each cycle of said voltage.

7. In combination, two alternating current circuits, two dynamo-electric machines having their rotors mechanically connected together, means for connecting the primary winding of one of said machines to one of said circuits, means for applying a voltage of slip frequency to the secondary winding of the other machine including an ohmic drop exciter having its rotor mechanically connected to the rotors of said machines, said exciter including a plurality of adjustable brushes, means responsive to a predetermined relation between the voltages of the primary winding of said other machine and the other circuit for controlling the adjustment of said brushes, and anti-hunting means for said brush controlling means including means responsive to the instantaneous value of said voltage, and timing means controlled by said voltage responsive means for rendering said brush controlling means operative to control the brushes for only a predetermined time during each half cycle of said voltage.

8. In combination, two alternating current circuits, two dynamo-electric machines having their rotors mechanically connected together, means for connecting the primary winding of one of said machines to one of said circuits, means for applying a voltage of slip frequency to the secondary winding of the other machine including an ohmic drop exciter having its rotor mechanically connected to the rotors of said machines, said exciter including a plurality of adjustable brushes, means responsive to a predetermined relation between the voltages of the primary winding of said other machine and the other circuit for controlling the adjustment of said brushes, said brush controlling means including a control circuit, a time relay having normally closed contacts in said control circuit, and means responsive to the instantaneous value of said voltage of slip frequency for effecting the completion of said control circuit and the operation of said time relay to effect the opening of its normally closed contacts after said control circuit has been closed for a predetermined time.

GEORGE S. WHITLOW.
HAROLD T. SEELEY.